Jan. 28, 1941.　　　　G. SAUER　　　　2,229,991
SEWING MACHINE
Filed Jan. 17, 1939　　　9 Sheets-Sheet 1
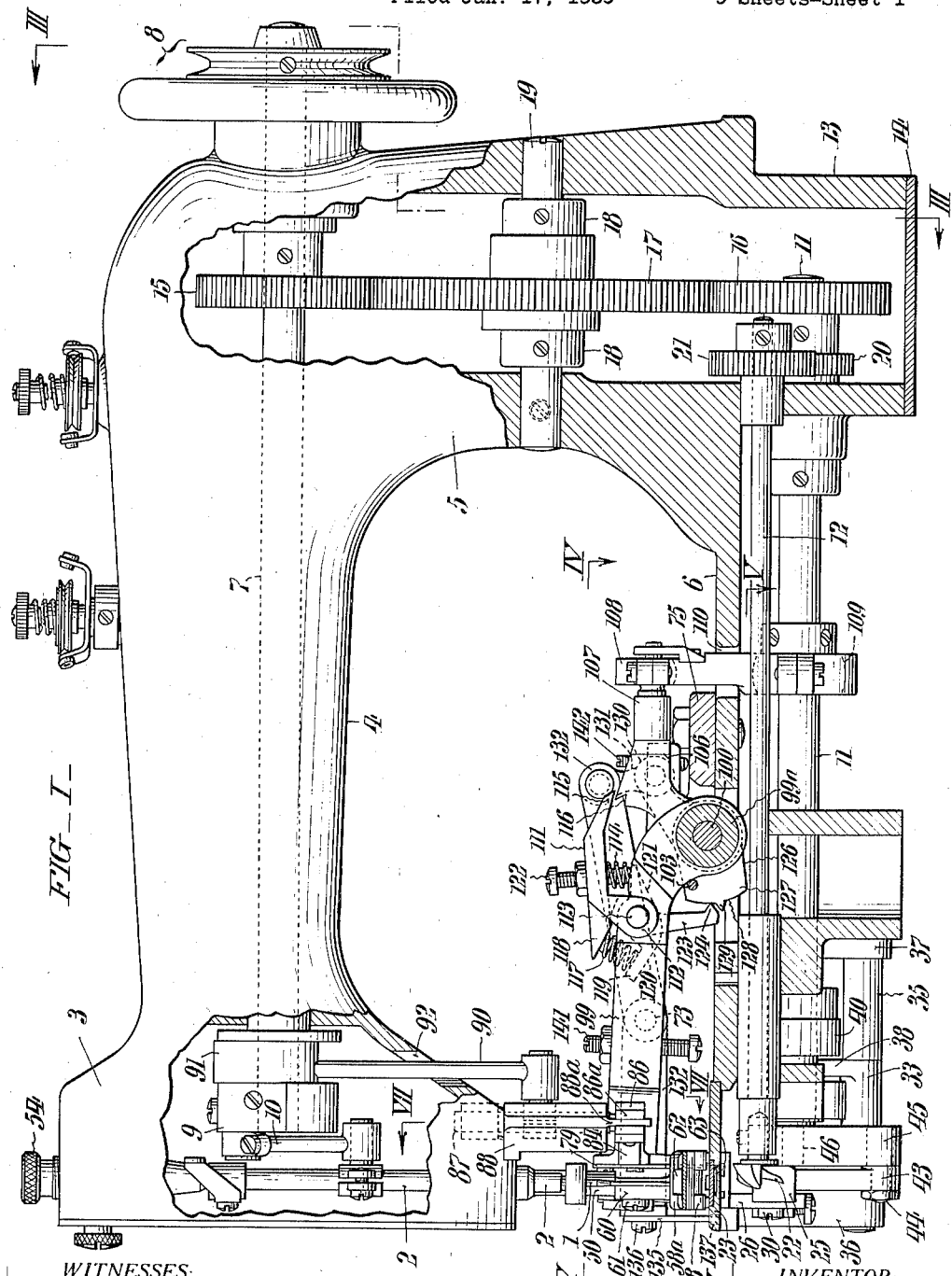
WITNESSES:　　　　　　　　　　　INVENTOR:
Hubert Fuchs　　　　　　　　　George Sauer,
William Bell, Jr.　　　BY　　　Paul & Paul
　　　　　　　　　　　　　　　ATTORNEYS.

Jan. 28, 1941.     G. SAUER     2,229,991
SEWING MACHINE
Filed Jan. 17, 1939     9 Sheets-Sheet 2
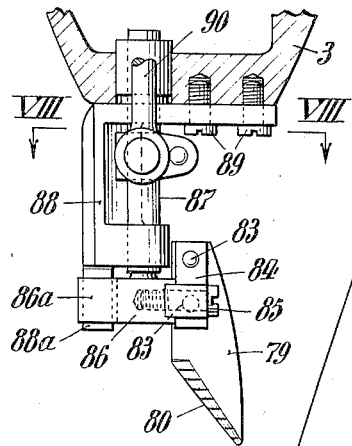
FIG. VII.
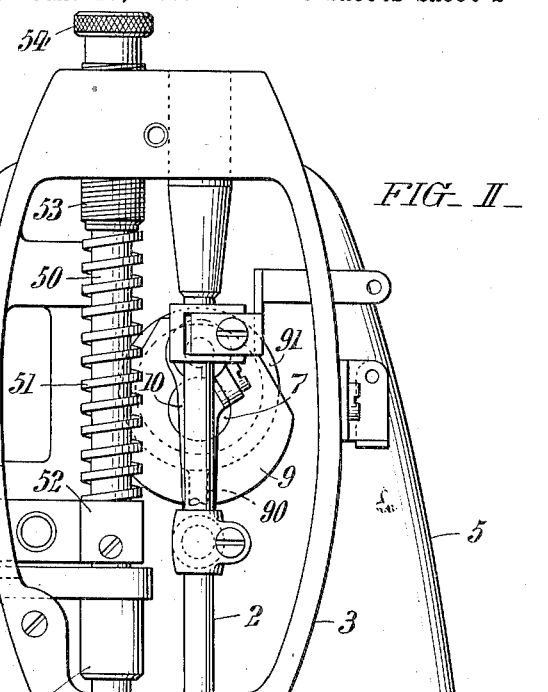
FIG. II.
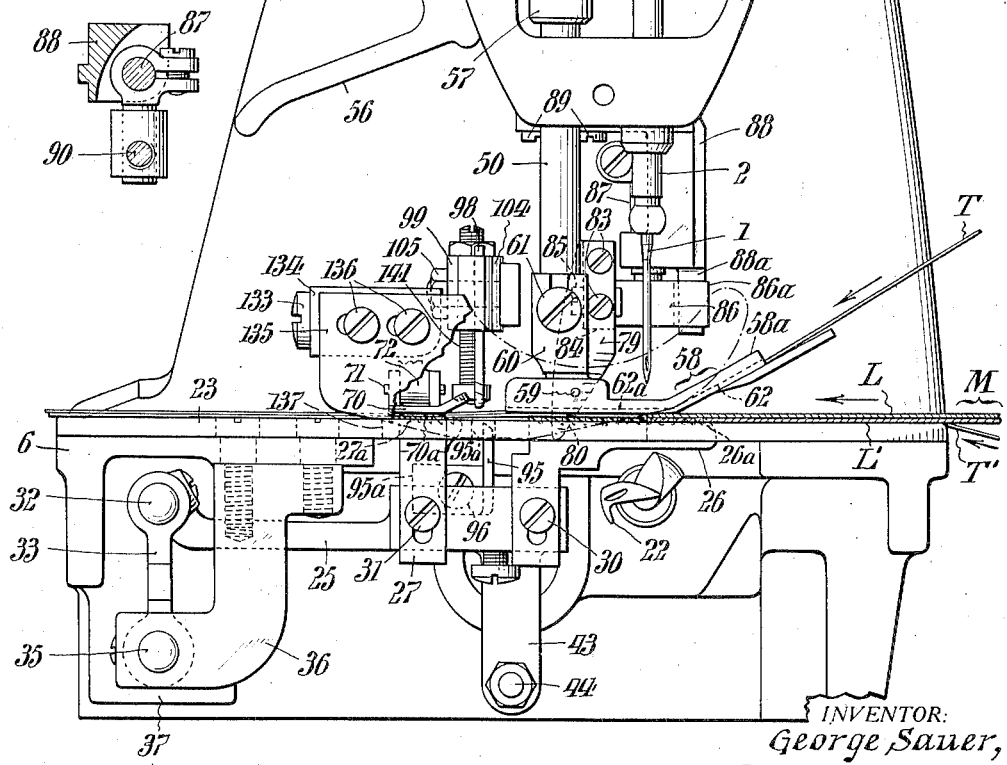
INVENTOR:
George Sauer,
BY
ATTORNEYS.

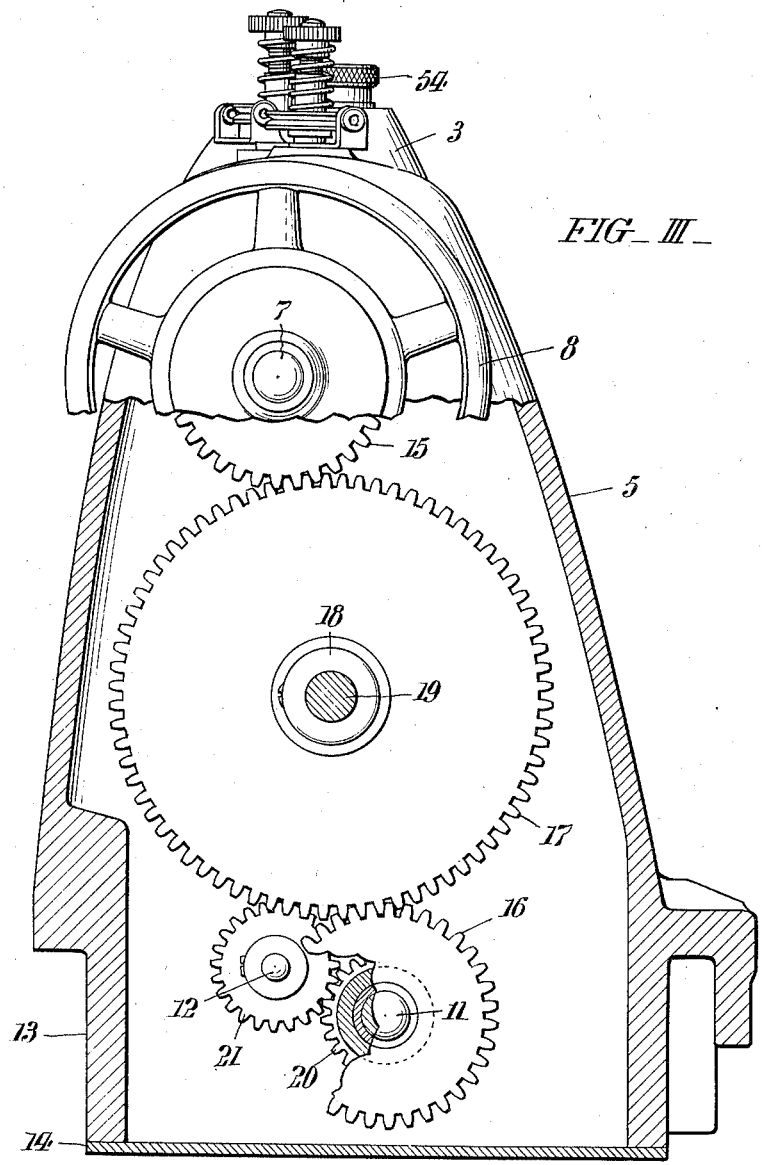

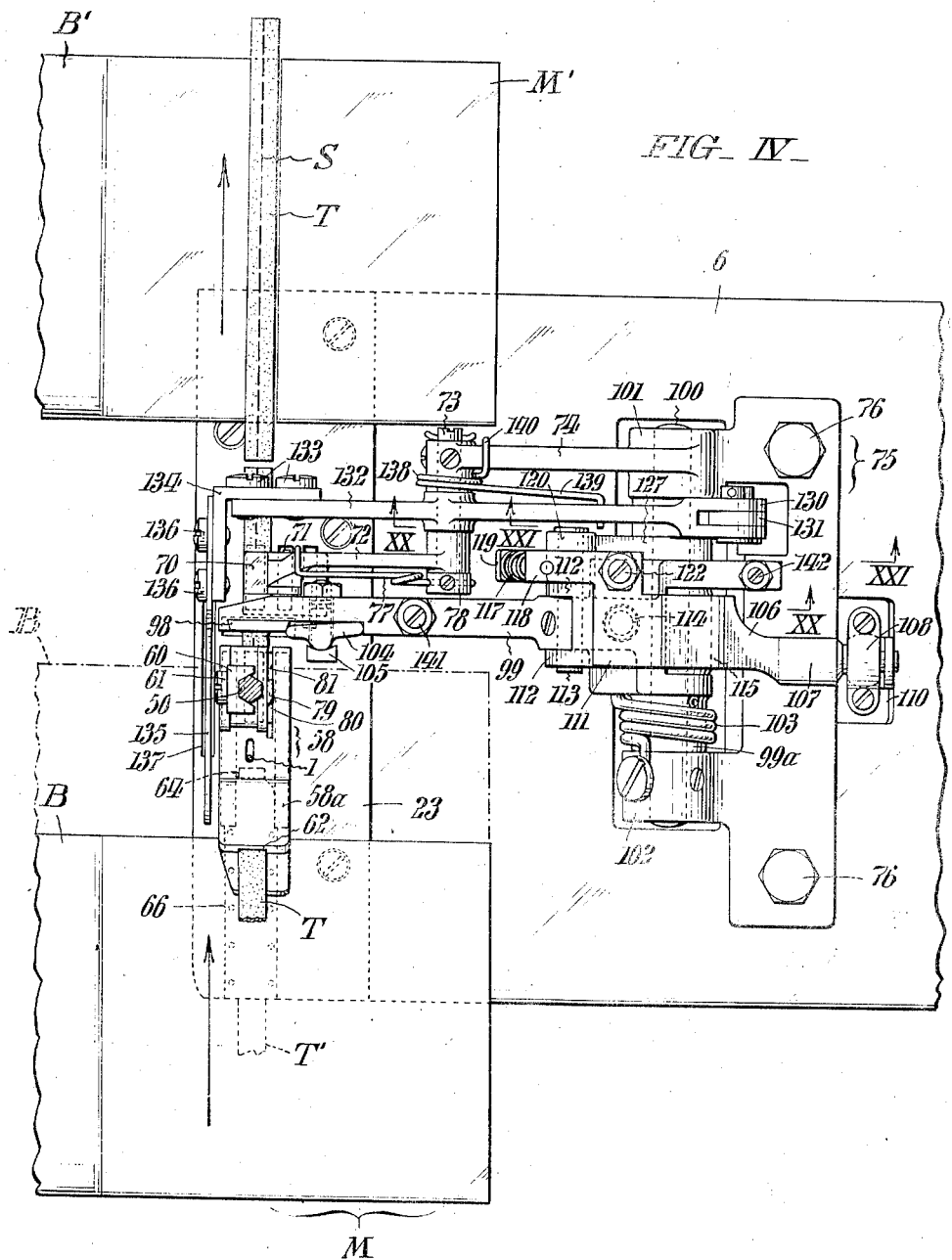

Jan. 28, 1941.   G. SAUER   2,229,991
SEWING MACHINE
Filed Jan. 17, 1939   9 Sheets-Sheet 5
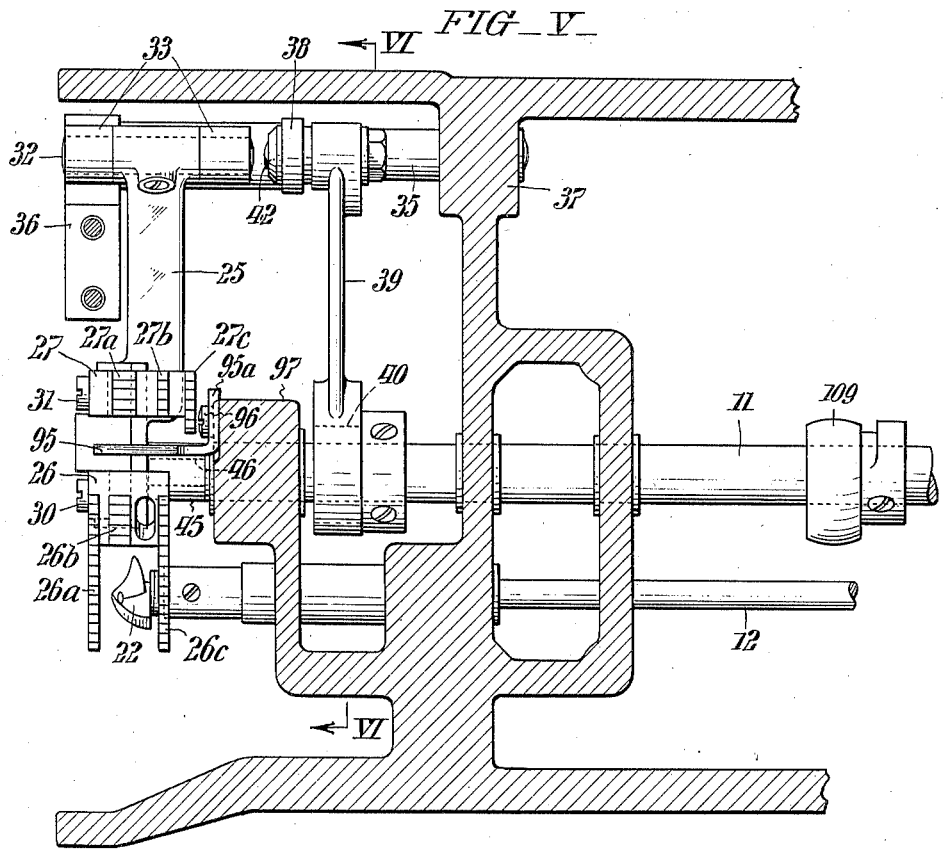
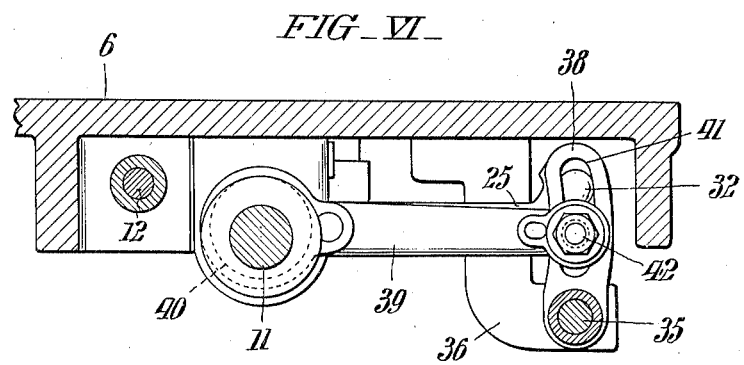
WITNESSES:
Hubert Fuchs
William Bell, Jr.
INVENTOR:
George Sauer,
BY Paul & Paul
ATTORNEYS.

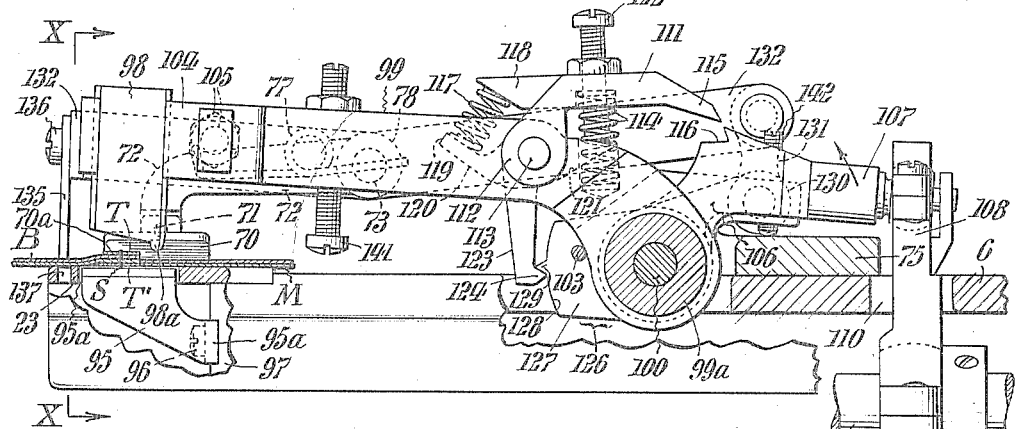

Jan. 23, 1941.  G. SAUER  2,229,991
SEWING MACHINE
Filed Jan. 17, 1939  9 Sheets-Sheet 7
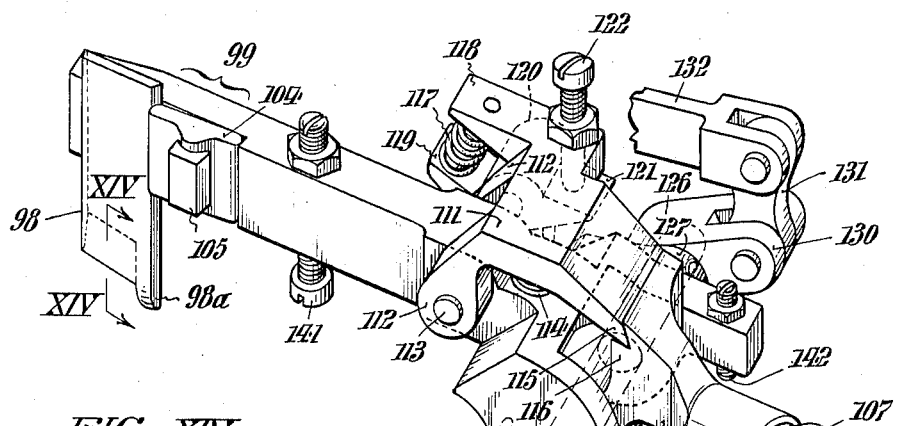
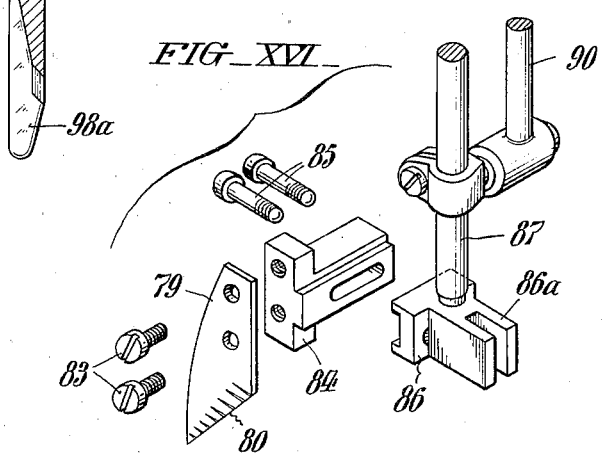
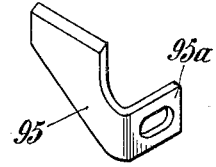
WITNESSES:
Hubert Fuchs
William Bell, Jr.
INVENTOR:
George Sauer,
BY
Paul & Paul
ATTORNEYS.

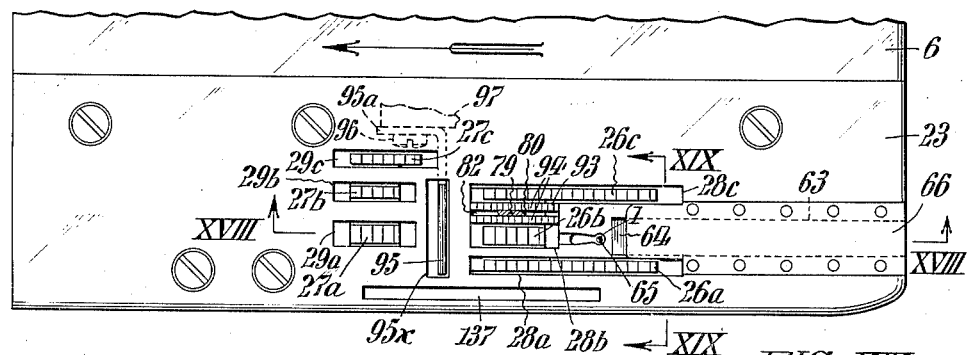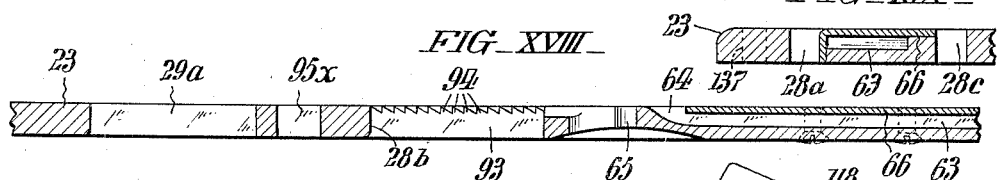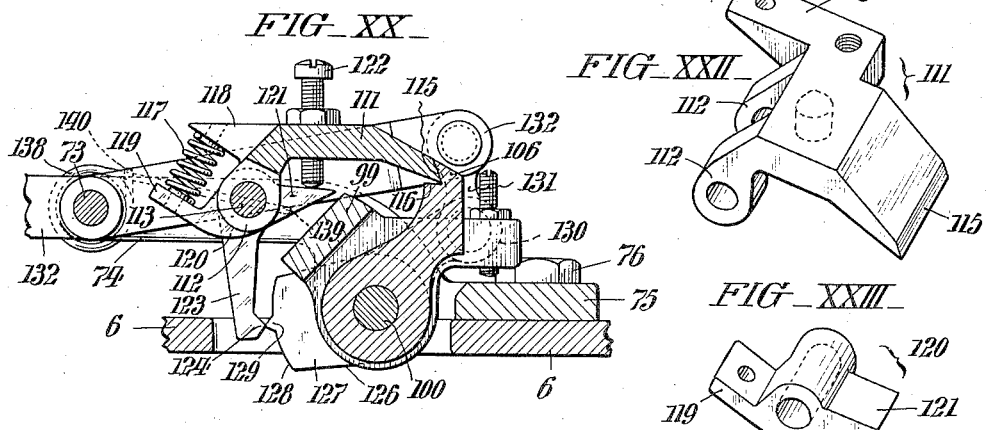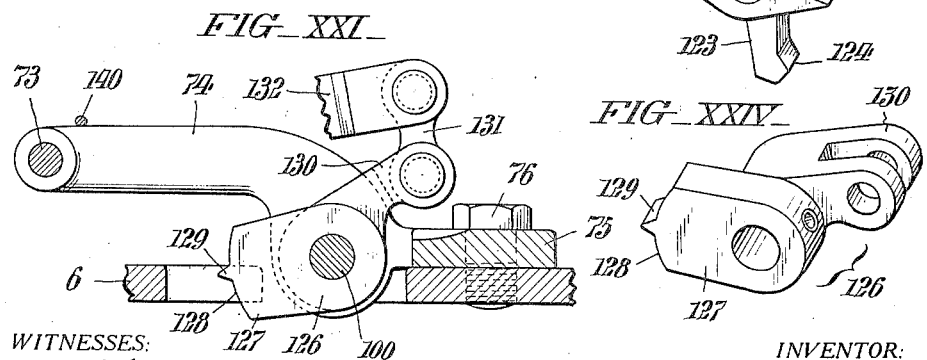

Jan. 28, 1941.                    G. SAUER                    2,229,991
SEWING MACHINE
Filed Jan. 17, 1939                           9 Sheets-Sheet 9
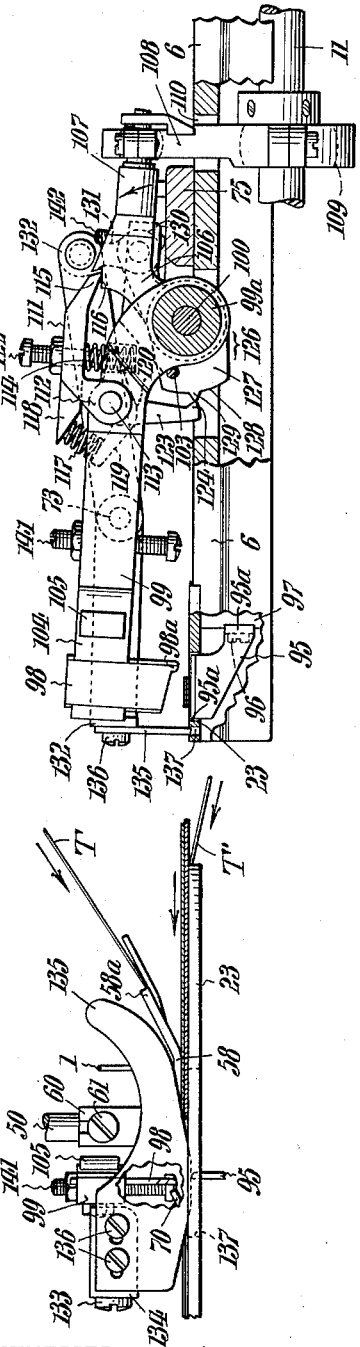
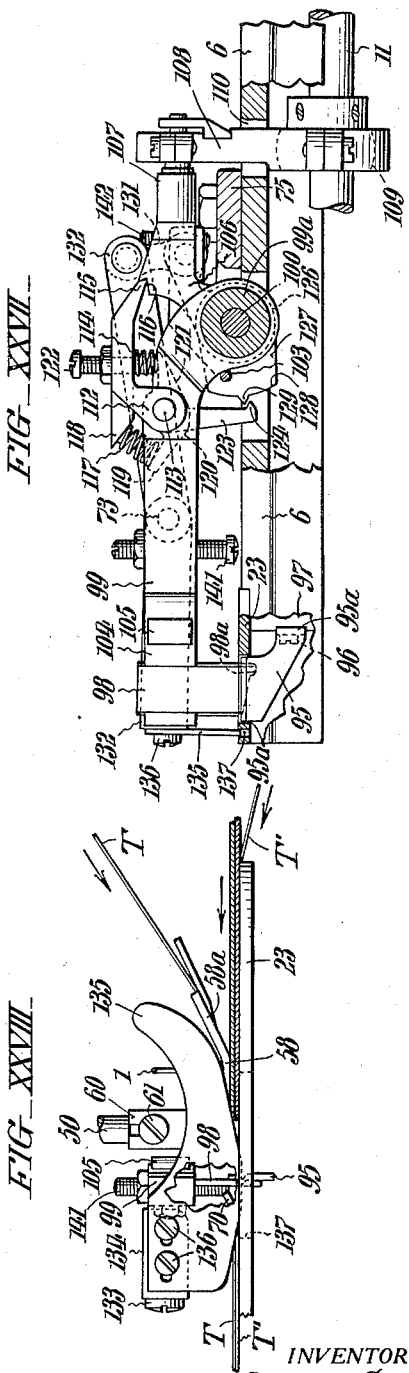
WITNESSES:
INVENTOR:
George Sauer,
BY
ATTORNEYS.

Patented Jan. 28, 1941

2,229,991

UNITED STATES PATENT OFFICE 2,229,991

SEWING MACHINE

George Sauer, Berwyn, Ill., assignor to Union Special Machine Company, Chicago, Ill., a corporation of Illinois Application January 17, 1939, Serial No. 251,298

16 Claims. (Cl. 112—252)

This invention relates to sewing machines, and it has reference more particularly to sewing machines for closing the mouths of filled bags.

In connection with sewing machines generally, I aim to make it possible through provision of improved mechanism, to trim the articles or pieces of material being sewed along a line parallel with the seam produced by the stitch-forming instrumentalities of the machine, and to transversely sever prolongations of the stitch chain at uniform distances beyond the leading and trailing side edges of the articles or pieces successively run through the machine irrespective of variations in their size or spacing.

In the embodiment of my invention hereinafter exemplified and more especially adapted for closing the mouths of filled bags, it is another aim of my invention to enable, through provision of auxiliary means for the purpose, concurrent application of reinforcing strip material or tape crosswise of opposite sides of the collapsed mouth ends of the bags for incorporation in the seam by the stitching.

Another aim of my invention is to make it possible in a sewing machine having the foregoing attributes, trimming of the material or articles being sewed along a line in parallel relation to the stitching—in the case of bag closing machines—along a line coincident with the outer edges of the reinforcing strips applied as above pointed out, to remove the excess end portions of the bag necks.

Another aim of my invention is to secure the foregoing objectives with trimming and severing mechanisms, which are simple in construction, quiet and reliable in operation, and which do not interfere with running of the sewing machine at high speeds.

Other objects and advantages will appear from the following detailed description of the attached drawings, wherein Fig. I is a view partly in elevation and partly in broken out longitudinal section, of a sewing machine conveniently embodying my invention.

Fig. II shows the front end elevation of the machine.

Fig. III is a view partly in rear elevation and partly in cross section, taken as indicated by the arrows III—III in Fig. I.

Figs. IV and V are fragmentary views in horizontal section, taken as respectively indicated by the arrows IV—IV and V—V in Fig. I.

Fig. VI is a fragmentary view in section, taken as indicated by the arrows VI—VI in Fig. V.

Fig. VII is a fragmentary view in section, taken as indicated by the arrows VII—VII in Fig. I, showing more particularly the trimming mechanism.

Fig. VIII is a detail sectional view, taken as indicated by the arrows VIII—VIII in Fig. VII.

Fig. IX is a detail sectional view corresponding to Fig. I, showing the stitch chain and reinforcing strip severing mechanism on a larger scale.

Fig. X is a detail sectional view, taken as indicated by the arrows X—X in Fig. IX.

Fig. XI is a view like Fig. X, with the parts in different positions.

Fig. XII is a perspective view of a supplemental presser foot forming a part of my invention.

Fig. XIII is a perspective view of a portion of the stitch chain and reinforcing strip severing mechanism.

Fig. XIV is a fragmentary sectional view of the movable knife blade of the stitch chain and strip severing mechanism.

Fig. XV is a perspective view of the fixed blade of the stitch chain and strip severing mechanism.

Fig. XVI is an exploded view in perspective, showing certain parts of the mechanism for trimming the bag material.

Fig. XVII is a fragmentary view in top plan of the throat plate of my improved machine.

Figs. XVIII and XIX are fragmentary sectional views of the throat plate, taken as indicated respectively by the arrows XVIII—XVIII and XIX—XIX in Fig. XVII.

Figs. XX and XXI are fragmentary sectional views of the stitch chain and strip severing mechanism, taken as indicated respectively by the arrows XX—XX and XXI—XXI in Fig. IV.

Figs. XXII, XXIII and XXIV are perspective views of various parts of the chain stitch and strip severing mechanism.

Figs. XXV, XXVI and XXVII, XXVIII are views corresponding respectively to Figs. IX, X, showing different phases of the operation of the stitch chain and strip severing mechanism.

As herein exemplified, my improved sewing machine has a needle 1 at the lower end of a bar 2 which is guided for endwise reciprocation in a head 3 at the end of an arm 4 horizontally sustained by a standard 5 above the flat bed or work support 6 of the machine. Suitably journaled within the hollow of the arm 4 is a longitudinal shaft 7 whereto is secured at the protruding end, a combined hand and belt wheel 8, so that the machine can be operated either manually or by power. Within the head 3, the shaft 7 carries a balanced crank member 9, which, through a pitman 10, is instrumental in reciprocating the needle bar 2. Beneath the work support 6 are journaled in parallelism with the shaft 7 two horizontal-shafts 11 and 12. As shown these shafts pass into a hollow downward extension 13 of the machine frame below and in direct communication with the interior of the standard 5, said extension being closed at the bottom by a removable plate 14 for the purposes of an oil sump. From Figs. I and III, it will be noted that shafts 7 and 11 are connected for rotation in unison and at like speeds by a train of spur gears within the standard 5, said train including similar pinions 15 and 16, respectively on said shafts and an intermediate idler wheel 17 which is freely mounted between collars 18 on an axle 19 extending crosswise between opposite side walls of said standard. By means of a pair of smaller intermeshing pinions 20 and 21, the shaft 12 is driven in unison with the shaft 11, but in the opposite direction. At its outer end, the shaft 12 carries a rotary looper 22 adapted to cooperate with the needle 1 below an inset throat plate 23 on the work support 6 to form chain stitches in a well known way.

The feed mechanism of the machine includes a feed bar 25, which, in accordance with my invention, supports main and supplemental feed dogs 26 and 27 in spaced relation, said dogs having three laterally spaced toothed portions 26a, 26b, 26c, and 27a, 27b, 27c, respectively, which operate upwardly through slots 28a, 28b, 28c, and 29a, 29b, 29c, in the throat plate 23, see Figs. II, V and XVII, and being secured to said feed bar with capacity for independent vertical adjustment by screws 30 and 31. The toothed portions 26a, 26b, 26c of the feed dog 26 are symmetrically disposed relative to the needle 1 in the direction of feeding, which is indicated by a large arrow in Fig. XVII, while the toothed portions 27a, 27b, 27c of the dog 27 are offset transversely of the direction of feeding with the sections 26b, 26c of the one in line with the sections 27a, 27b of the other. The reason for this arrangement will become apparent later. Fixed within a boss at the outer end of the feed bar 25 is a pin 32 which forms a pivotal connection between said bar and the upper end of a rocker 33. As shown, the rocker 33 is mounted for oscillation about a shaft 35 supported at one end in a bearing bracket 36 on the underside of the work support 6 and at the opposite end in a bearing lug 37 pendant from said work support. Inward of the feed bar 25, the rocker 33 has a vertical arm 38, which, through the medium of a horizontal strap link 39, is connected with an actuating eccentric 40 on the shaft 11, see Fig. V. By the means just described, horizontal to and fro or feed movements are imparted concurrently to the two feed dogs 26 and 27. By reference to Fig. VI, it will be observed that the arm 38 of the rocker 33 is longitudinally slotted as at 41 for adjustment of the pivotal connection 42 between said arm and the link 39 so that the throw of the feed dogs 26 and 27, and hence the stitch length, may be varied. At its front end the feed bar 25 has a depending projection 43 pivotally connected at 44 with a strap 45 in engagement with another eccentric 46 on the shaft 11, whereby up and down or lift movements are concurrently imparted to the two feed dogs.

The presser bar of the machine indicated at 50 is guided as ordinarily in the needle head 3, and is yieldingly urged downward by a spring 51 in compression between a collar 52 on said bar and the upper bearing sleeve 53 for said bar. As shown, the sleeve 53 is threadedly engaged in the top of the needle head 3 and provided above the latter with a knurled head 54 for convenience of adjusting the pressure of the spring. Rotation of the presser bar 50 is prevented as a consequence of the engagement of a lateral projection 52a of the collar 52 thereon with a vertical slot 55 in one side of the needle head 3. By means of a finger lever 56 with a cam projection 56a to cooperate with the extension 57a of another collar 57 on the presser bar 50, said bar may be lifted and locked in elevated position with the presser foot 58 at the lower end of the bar raised above the work support. As shown, the presser foot 58 is pivotally connected at 59 to a shank member 60 secured by a screw 61 to the lower end of the presser bar 50, with capacity to rock up and down in adapting itself to the work progressed beneath it by the feed dogs 26 and 27. In accordance with my invention, the presser foot 58 is formed with an upturned end 58a which is slotted as at 62 to serve as a guide for a reinforcing strip or tape T which is applied crosswise of the mouths of the bags at one side, as later on explained, said slot being continued as a groove 62a in the underside of the horizontal portion of the presser foot, see Figs. II and XI. A second reinforcing strip or tape T' for application to the opposite sides of the bag mouths is guided through a slot 63 formed in the throat plate 23, see Figs. I, XVII, XVIII, said slot terminating in an upwardly directed outlet at 64 slightly in advance of the needle hole 65 in the throat plate as considered with respect to the direction of feeding. As shown in Fig. XVII, tape guide slot 63 has a removable cover plate 66, whereof the inner end is extended as a tongue between the slots 28a, 28c in the throat plate 23 to restrict the size of the outlet 64 for the reinforcing strip or tape T'.

Cooperating with the supplemental feed dog 27 to assist in holding the bag material and the strips T, T' to the work support 23 during the stitching, is a supplemental presser foot 70. As shown, this supplemental presser foot 70 is pivotally connected at 71 to the outer end of a horizontal arm 72 (Figs. II, IV and XII) fulcrumed on a stud 73 which projects laterally from the forwardly reaching arm 74 of a bracket 75 secured by bolts 76 to the top of the work support 6, see Fig. IV. A finger spring 77 anchored in a fixed collar 78 on the stud 73 and pressing upon the arm 72 serves to urge the supplemental presser foot 70 toward the work support 6 over the region of the supplemental feed dog 27. From Fig. IX it will be observed that the presser foot 70 is upwardly recessed as at 70a to compensate for the added thickness of the strips T, T'.

By the mechanisms thus far described, the two reinforcing strips T, T' are concurrently applied crosswise of opposite faces of the collapsed mouths M, M' of the bags B, B' (Fig. IV) successively advanced beneath the presser feet 58, 70 by the action of the feed dogs 26, 27, and said bag mouths sealed by a line of chain stitches S formed substantially centrally of the tapes as shown in Fig. IV.

The means provided for trimming off the excess portions of the bag necks includes a vertically reciprocating pointed cutting blade 79 with an inclined knife edge 80 opposed to the direction of feeding, said edge being notched at intervals, see Figs. II, VII and XVI, so as to cut after the manner of a rip saw. The blade 79 passes down through a clearance slot 81 in the presser foot 58 to one side of the plane of the presser bar 50 and also through a registering slot 82 in the throat plate, see Fig. XVII, to shear against one side of the latter slot, so that the trimming is effected in coincidence with the outer edges of said reinforcing strips T, T'. As shown in Figs. II, VII and XVI, the movable knife blade 79 is secured, by a pair of screws 83, to a block 84 which latter is in turn secured, with capacity for horizontal adjustment laterally of the line of feeding, by screws 85, to a head 86 at the lower end of a vertical slide rod 87. From Fig. VII it will be noted that the slide rod 87 is guided in a bracket 88 fastened by screws 89 to the bottom of the needle head 3, and from Fig. I, that it is actuated, through a pitman 90, from an eccentric 91 affixed to the upper shaft 7 of the machine immediately adjacent the counter-balanced crank member 9, said pitman extending through a clearance opening 92 in the sloping bottom portion of the head 3. Rotation of the rod 87 is prevented through engagement of a clevised projection 86a on the head 86 with a pendant projection 88a on the bracket 88 so that the blade 79 is accurately maintained at all times in proper shearing relation with the slot 82 in the throat plate 23. It is to be observed that the surface of the bridging portion 93 of the throat plate 23 in which the slot 82 is formed, is roughened, i. e., provided with teeth 94, see Figs. XVII and XVIII, which are inclined counter to the sloping edge 80 of the knife blade 79 so as to prevent, by cooperation with the presser foot 58, retrogression and buckling of the bag material as said blade descends.

The improved mechanism which I have devised for severing the stitch chain and the strips T, T' beyond opposite side edges of the bags, includes an adjustably supported stationary blade 95 which is arranged crosswise of the interval between the main and an auxiliary feed dogs 26, 27 and the corresponding main and supplemental presser feet 58, 70 and the cutting edge of which is exposed within a transverse slot 95x in the throat plate 23, see Figs. II and XVII. As shown, the stationary blade 95 has a lateral wing 95a with a horizontal slot through which the shank of a cap screw 96 passes and engages into a pendant bearing projection 97 of the work support, see Figs. V, XV and XVII. With the stationary blade 95 cooperates a movable blade 98 at the outer end of an arm 99 fulcrumed on a shaft 100 which is fixedly supported at opposite ends in spaced bosses 101, 102 of the bracket 75 hereinbefore referred to (Fig. IV). The movable blade 98 is normally held in the retracted position shown in Fig. IX by a coiled torsion spring 103 which surrounds a boss 99a on the arm 99, one end of said spring being anchored in the bearing 102 of the bracket 75 and the other end engaging into the side of said arm. As shown in Figs. IV and XIII, the knife 98 is adjustably held in a dovetail groove jointly formed by the arm 99 and a clamp plate 104 secured to said arm by a transverse bolt 105; and at its lower end said knife has a depending rounded cam lug 98a. As the blade 98 descends, the lug 98a first encounters the fixed blade 95 to properly guide and align the cutting edge of the former relative to that of the latter. Free on the shaft 100 within a bifurcation at the fulcrum end of the knife arm 99, is a member in the form of a rocker 106 which is constantly oscillated as a consequence of the connection of an arm 107 thereon by a link 108 with an eccentric 109 on the shaft 11, said link passing through a clearance opening 110 in the work support 6. Arranged to coact with the member 106 is a coupling member in the form of a latch dog 111 which straddles the knife arm 99, the pendant ears 112 of said dog extending downward of opposite sides of said arm and freely engaging the opposite ends of a pivot pin 113 passing through the arm, see Figs. XIII and XXII. A compression spring 114 seated in a socket in the top of the knife arm 99 adjacent the pin 113, exerts upward pressure upon the latch dog 111 to hold the latter elevated with its pawl end 115 normally retracted out of the path of the notched portion 116 of the constantly oscillating member 106. Opposing the action of the spring 114 is a lighter spring 117 in compression between a tail projection 118 of the latch dog 111 and a corresponding projection 119 on a trigger element 120 which is freely fulcrumed on the pin 113 at one side of the knife arm 99 in contiguous relation with the corresponding ear 112 of the latch dog 111. As shown in Figs. IX, XX and XXIII, the trigger element 120 has a horizontal projection 121 opposite the projection 119 which abuts a vertical stop screw 122 adjustable in the dog 111. The trigger element 120 also has a depending finger 123 with a sharp cam projection 124 at its free end. By the action of the spring 117, the feeler finger 123 is yieldingly urged toward a control member 126 which is free on the shaft 100 adjacent the knife arm 99, see Figs. XIII, XXI and XXIV. As shown, this control member 126 has an arm 127 with an end surface 128 which is rounded concentrically with the axis of the shaft 100, said surface having a sharp medially disposed cam projection 129 extending outward therefrom. The control member 126 is moreover formed with a rearwardly extending arm 130, which, by means of a link 131, is pivotally connected to the rear end of a detector arm 132, the latter being fulcrumed on the stud 73 in the arm 74 of the bracket 75, in the interval between the arm 72 of the auxiliary presser foot and the boss at the outer end of said bracket arm. Connected, with capacity for adjustment, to the free end of the detector arm 132, by screws 133, is an angle piece 134 whereof the outer leg carries a detector 135 which is engaged by the collapsed mouths of the bags successively passed through the machine. As shown in Figs. X and XI, the detector 135 is fashioned from stout sheet metal to the form of a shoe whereof the bottom edge is sloped upwardly at the same angle but in opposite directions as at 135a, 135b from a flat central portion 135c, said shoe being horizontally slotted and secured to the angle plate 134 by screws 136 so that it may be adjusted in the direction of feeding. When the shoe 135 is properly adjusted, its flat bottom edge portion 135c is centered in respect to the cutting plane of the severing blades 95, 98 as best shown in Fig. X. After the bags have traveled beyond the detector 135, the latter is depressed into a slot 137 in the throat plate 23 by a coiled spring 138 whereof one end 139 is extended as a finger to underreach the arm 132 rearwardly of its fulcrum, while the other end 140 is hooked over the top of the fixed bracket arm 74. The adjustable stop screws shown at 141, 142 in Figs. I, XIII, XXV and XXVII operate by contact respectively with the top of the work support 6 and the bracket 75 to limit the rocking movement of the knife arm 99 about its fulcrum 100.

The operation of the machine is as follows:

In Fig. IV, the portion of the stitched reinforcing strips T, T' extending between the sealed bag B' and the succeeding unsealed bag B has just been severed and the knife blade 98 returned to its normal retracted position, the excess portion of the bag neck having been trimmed off by the knife 79 in coincidence with the outer edges of said strips. Moreover, in Fig. IV and also in Fig. II, leading side edge of the collapsed mouth M of the bag B has just entered between the strips T, T' and between the main presser foot 58 and the work support 6. Upon slight further advance of the bag B by the main feed dog 26, the leading edge of the bag mouth M encounters the detector shoe 135 and begins to lift the latter as shown in Fig. XXVI. By the movement thereby induced in the detector arm 132, the control member 126 is turned clockwise slightly about the shaft 100 to the position shown in Fig. XXV incident to which the cam ridge 129 on said member engages the feeler finger 123 of the trigger element 120 and causes the latter to take the position illustrated in Fig. XXV. By means of the spring 117, this movement is transmitted to the latch dog 111 with the result that the pawl end 115 of said dog is depressed into the path of the notched portion 116 of the constantly oscillating member 106. Consequently upon the succeeding anti-clockwise movement of the member 106 about the shaft 100, the latch dog 111 is moved forward (leftward) in Figs. XX and XXVII, and the knife arm 99 thereby depressed against the action of the spring 103 so that the knife blade 98 in the latter is caused to coact with the fixed knife blade 98 as shown in Fig. XXVII and XXVIII, and sever the stitched strips T, T' somewhat in advance of the leading edge of the bag mouth.

The severance actually occurs when the bag B has reached the position shown in dot-and-dash lines in Fig. IV. In the event that the latch dog 111 is actuated at a time when the notched portion 116 of the member 106 is in its forward position, the spring 117 will yield to prevent jamming and thereby preclude injury to the mechanism. Upon further advance of the leading side edge of the bag mouth M until its two thicknesses are fully beneath the detector shoe 135, the cam projection 129 on the control member 126 will be moved to the position shown in Fig. IX above the cam projection 124 on the finger 123 of the trigger element 120 so as to allow the latch dog to be lifted by the spring 114 during the succeeding clockwise movement of the constantly oscillating member 106, said strip member remaining in the position last described as long as the detector shoe 135 is engaged by the bag mouth as in Figs. IX and X with the severing knife blade 98 retracted and quiescent all the while. When the trailing side edge of the bag mouth B finally passes beyond the detector shoe 135 as in Fig. XI, the detector arm 132 is urged toward the work support 6 by the spring 138, with attendant importation of counter-clockwise movement to the control member 126, so that the cam projection 129 on the latter again actuates the trigger element 111 to move the pawl end 118 of the latch dog 111 into the path of the constantly oscillating cam member 106 and thereby effect another actuation of the knife arm 99 and severance of the stitched strips T, T' at a point somewhat to the rear of the trailing edge of the bag mouth. By adjustment of the detector shoe 135 relative to its supporting arm 132 by the means provided for that purpose, it is possible to time the strip cutting so that the length of the strip projections beyond the opposite side edges of the bag mouth will be exactly the same. This will be the case irrespective of variations in the widths of the bag mouths or in the spacing of the bags successively passed through the machine. Clean and sharp cutting of the strips T, T' is preassured since it is effected in the short interval between the points where the presser feet 58 and 70 firmly clamp the strip against the work support 6, the severing being timed to occur during the idle or retracting periods of the feed dogs 26, 27. As the bag material passes through the machine, the detector shoe 135 acts somewhat after the manner of a presser foot adjacent the portion 26a of the main feed dog 26; while the portion 27c of the supplemental feed dog 27 acts alone to advance the excess portion of the bag mouth as it is trimmed off by the trimming blade 79. The aligned portions 26b and 27a of the feed dogs 26, 27 act directly on the stitching S and the strips T, T', the portion 26b of the feed dog being opposed by the upwardly recessed portion of the main presser foot 26 and the portion 27b of the supplemental feed dog 27 being opposed by the independently mounted supplemental presser foot 70 whose shouldered bottom recess 70a acts as a guide for the outer edges of the attached reinforcing strips T, T' after the bag mouth has been trimmed. Skewing or displacement of the bags incident to passage through the machine is thus effectively prevented.

For sewing empty bags or other flat articles, the machine is in practice used in the position illustrated, i. e., with the work support 6 horizontal. For the closing of filled bags, however, it is supported in suspension with the work support vertical and with the combined hand and belt wheel 8 uppermost, and the bags either moved beneath the machine, or the machine moved relative to the bags, in ways well known in the art.

By reason of their simplicity, the trimming and severing mechanisms of my improved sewing machine can be relied upon for efficient operation over long periods of use without danger of derangement or untiming. Their construction is moreover such as to favor high speed operation of the sewing machine, since they are respectively actuated through movement derived from the continuously revolving shafts 7 and 11, which are intergeared for rotation in unison. This is especially true since the strip severing mechanism is called upon to function but twice for each article or bag, whereas in old art forms of such mechanism, the cutting instrumentalities were maintained in continuous operation between articles or bags with attendant causation of rapid wear of the component parts.

It is, of course, to be understood that my improved sewing machine can be employed for purposes other than bag closing where it is advantageous or desirable to cut a seaming stitch chain between successive articles either with or without incorporated reinforcing or binding strips, and to trim the articles along a line parallel with the stitching. The broader of the following claims are, therefore, to be construed with the above in mind.

Having thus described my invention, I claim:

1. In a sewing machine, means for continuously chain stitching articles successively fed in spaced relation; and stitch chain severing mechanism including a constantly oscillating member, a cutter, a coupling member on the cutter, yielding means for normally holding the coupling member out of the range of the constantly oscillating member, a detector adapted to be engaged by each article progressed through the machine, a cam connected to the detector and having a smooth surface with a small offset intermediate its ends, and a trigger independently mounted on the cutter and bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter in the same manner as before to sever the stitch chain rearward of the article.

2. In a sewing machine, means for continuously chain stitching articles successively fed in spaced relation; and stitch chain severing mechanism including a constantly oscillating member, a cutter, a coupling member on the cutter, yielding means for normally holding the coupling member out of the range of the constantly oscillating member, a detector adapted to be engaged by each article progressed through the machine, a cam connected to the detector and having a smooth surface with a small ridge projection intermediate its ends, and a trigger independently mounted on the cutter and bearing upon the cam, whereby as the detector is initially engaged by each article entering the machine, the cam is moved in one direction so that as its projection passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its projection in again passing the trigger causes another actuation of the cutter in the same manner as before to sever the stitch chain rearward of the article.

3. In a sewing machine, means for continuously chain stitching articles successively fed in spaced relation; and stitch chain severing mechanism including a constantly oscillating member, a cutter, a coupling member on the cutter, yielding means normally holding the coupling member out of the range of the constantly oscillating member, a detector adapted to be engaged by each article progressed through the machine; a pivoted cam connected to the detector, said cam having a curved surface concentric with its pivot, and a small offset intermediate the ends of said surface, a trigger independently mounted on the cutter and bearing on the cam surface, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger causes another actuation of the cutter in the same manner as before to sever the stitch chain rearward of the article.

4. In a sewing machine, means for continuously chain stitching articles successively fed in spaced relation; and stitch chain severing mechanism including a constantly-oscillating member, a cutter, a coupling member pivotally mounted on the cutter, yielding means for holding the coupling member normally out of the range of the oscillating member, a detector adapted to be engaged by each article progressed through the machine, a cam connected to the detector and having a smooth surface with a small offset intermediate its ends, and a trigger independently pivoted on the cutter and bearing on the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter in the same manner as before to sever the stitch chain rearward of the article.

5. In a sewing machine, means for continuously chain stitching articles fed in spaced relation; and stitch chain severing mechanism including a constantly oscillating member, a fulcrum axis for said member, a cutter independently pivoted on the fulcrum axis, a coupling member on the cutter, yielding means for holding the coupling member normally out of the range of the oscillating member, a detector adapted to be engaged by each article progressed through the machine, a cam independently pivoted on the fulcrum axis of the constantly oscillating member and having a smooth concentric surface with a small offset intermediate its ends, and a trigger independently mounted on the cutter, and bearing upon the cam surface, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter in the same manner as before to sever the stitch chain rearward of the article.

6. In a sewing machine, means for continuously chain stitching articles successively fed in spaced relation; and stitch chain severing mechanism including a constantly oscillating member, a cutter, a coupling member on the cutter, yielding means for normally holding the coupling member out of the range of the constantly oscillating member, a detector adapted to be engaged by each article progressed through the machine, a cam connected to the detector and having a smooth surface with a small offset intermediate its ends, and a trigger independently mounted on the cutter bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter in the same manner as before to sever the stitch chain rearward of the article, and means interposed between the coupling member and the trigger, whereby said element is permitted to yield if it is moved at a time when the constantly oscillating member is in advanced position.

7. In a sewing machine, means for continuously chain stitching articles fed in spaced relation; and stitch chain severing mechanism including a constantly oscillating member, a fulcrum axis for said member, a cutter independently mounted on the fulcrum axis of the constantly oscillating member, a latch dog pivotally mounted on the cutter, a resilient element interposed between the cutter and the dog to normally hold the latter out of the range of the constantly oscillating member, a detector adapted to be engaged by each article progressed through the machine, a cam independently fulcrumed on the fulcrum axis of the oscillating member and having a smooth surface with a small offset intermediate its ends, and a trigger independently movable about the pivot for the latch dog, said trigger having a lateral projection to one side of the pivot between which and a tail projection on the dog a resilient element is interposed, a lateral arm at the opposite side of the pivot abutting an adjustable stop on the dog, and a depending feeler finger which bears upon the cam, whereby as the detector is initially engaged by each article entering the machine, the cam is moved in one direction so that its offset passes the feeler finger of the trigger, the latter is operated to move the dog momentarily into the path of the constantly oscillating member for actuation of the cutter to sever the chain stitch in advance of the article, and whereby as the article is progressed beyond the detector, the cam is moved in the opposite direction so that its offset in again passing the feeler finger of the trigger causes another actuation of the cutter in the same manner as before to sever the stitch chain rearward of the article, the second mentioned resilient element permitting the dog to yield if it is moved at a time when the constantly oscillating member is in advanced position.

8. In a sewing machine, means for continuously chain stitching articles successively fed in spaced relation; and stitch chain severing mechanism including a constantly oscillating member, a cutter, a coupling member on the cutter, yielding means for normally holding the coupling member out of the range of the constantly oscillating member, a detector arm with a shoe at its free end adapted to be engaged by each article progressed through the machine, a cam connected to the detector arm and having a smooth surface with a small offset intermediate its ends, and a trigger independently mounted on the cutter and bearing on the cam, whereby as the detector shoe is initially engaged by each article entering the machine, the cam is moved in one direction so that as its offset passes the trigger the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger causes another actuation of the cutter in the same manner as before to sever the stitch chain rearward of the article, the shoe of the detector being so disposed relative to the plane of the cutting edge of the cutter as to predetermine equal lengths of the stitching forward and rearward of the article.

9. In a sewing machine, means for continuously chain stitching articles successively fed in spaced relation; stitch chain severing mechanism including a constantly oscillating member, a cutter, a coupling member on the cutter, yielding means for normally holding the coupling member out of the range of the constantly oscillating member, a detector adapted to be engaged by each article progressed through the machine, a cam connected to the detector and having a smooth surface with a small offset intermediate its ends, and a trigger independently mounted on the cutter bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter in the same manner as before to sever the stitch chain rearward of the article, and means to guide continuous reinforcing strip material for attachment to the articles by the stitching and for concurrent severance with the stitch chain between successive articles by the cutter.

10. In a sewing machine, means for continuously chain stitching articles successively fed in spaced relation; stitch chain severing mechanism including a constantly oscillating member, a cutter with a cutting blade, a coupling member on the cutter, yielding means for normally holding the coupling member out of the range of the constantly oscillating member, a detector engaged by each article progressed through the machine, a cam connected to the detector and having a smooth surface with a small offset intermediate its ends, and a trigger independently mounted on the cutter and bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter as before to sever the stitch chain rearward of the article; a presser foot to the front of the plane of the cutting blade in the direction of feeding; and guide grooves in the work support and the presser foot for directing reinforcing strips to opposite faces of the articles for attachment by the stitching and for severance concurrently with the stitch chain.

11. In a sewing machine, means for continuously chain stitching articles successively fed in spaced relation; stitch chain severing mechanism including a constantly oscillating member, a cutter with a cutting blade, a coupling member on the cutter, yielding means for normally holding the coupling member out of the range of the constantly oscillating member, a detector engaged by each article progressed through the machine, a cam connected to the detector and having a smooth surface with a small offset intermediate its ends, and a trigger independently mounted on the cutter and bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter as before to sever the stitch chain rearward of the article; a presser foot to the front of the plane of the cutting blade in the direction of feeding; guide grooves in the work support and the presser foot for directing reinforcing strips to opposite faces of the articles for attachment by the stitching and for severance concurrently with the stitch chain; and an independently mounted supplemental presser foot to the rear of the plane of the cutting blade in the direction of feeding having a shoulder at its bottom to assist in guiding the outer edge of the upper strip after the stitching.

12. In a sewing machine, means for continuously chain stitching articles successively fed in spaced relation; stitch chain severing mechanism including a constantly oscillating member, a cutter with a cutting blade rearward of the stitching means with regard to the direction of feeding, a coupling member on the cutter, yielding means for normally holding the coupling member out of the range of the constantly oscillating member, a detector engaged by each article progressed through the machine, a cam connected to the detector and having a smooth surface with a small offset intermediate its ends, and a trigger independently mounted on the cutter and bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter as before to sever the stitch chain rearward of the article; a pressed foot to the front of the plane of the cutting blade in the direction of feeding; and means between the stitching means and the severing means for trimming the articles along a line parallel with the chain stitch seam.

13. In a sewing machine, means for continuously chain stitching articles successively fed in spaced relation; stitch chain severing mechanism including a constantly oscillating member, a cutter with a cutting blade rearward of the stitching mechanism with respect to the direction of feeding, a coupling member on the cutter, yielding means for normally holding the coupling member out of the range of the constantly oscillating member, a detector engaged by each article progressed through the machine, a cam connected to the detector and having a smooth surface with a small offset intermediate its ends, and a trigger independently mounted on the cutter and bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter as before to sever the stitch chain rearward of the article; a presser foot to the front of the plane of the clutch blade in the direction of feeding; guide grooves in the work support and the presser foot for directing reinforcing strips to opposite faces of the articles for attachment by the stitching and for severance concurrently with the stitch chain; and means between the stitching means and the blade of the severing means for trimming the articles along a line coincident with one edge of the reinforcement.

14. In a sewing machine, means for continuously chain stitching articles successively fed in spaced relation; stitch chain severing mechanism including a constantly oscillating member, a cutter with a cutting blade operative rearwardly of the stitching means with regard to the direction of feeding, a coupling member on the cutter, yielding means for normally holding the coupling member out of the range of the constantly oscillating member, a detector engaged by each article progressed through the machine, a cam connected to the detector and having a smooth surface with a small offset intermediate its ends, and a trigger independently mounted on the cutter and bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter as before to sever the stitch chain rearward of the article; a work support; a presser foot to the front of the plane of the cutting blade in the direction of feeding; a work support with a slot therein and with a surface portion adjacent the slot having teeth facing in the direction of feeding; means for trimming the articles along a line parallel with the stitch seam, including a pointed knife blade operative between the stitching means and the blade of the severing means which passes down into the slot in the work support, and which has an inclined cutting edge opposed to the direction of feeding; and a presser foot opposing the toothed portion of the work support to hold the articles against retrogression during descent of the trimming blade.

15. In a sewing machine, a needle and complemental means for continuously chain stitching articles fed in spaced relation; feeding means; a shaft from which the needle is actuated; another shaft from which the complemental stitch forming means and the feeding means are actuated; gearing interconnecting the two shafts for operation in unison; severing mechanism including a member constantly oscillated from the last mentioned of the aforesaid shafts, a cutter operative rearward of the needle with regard to the direction of feeding, a coupling member on the cutter, yielding means for normally holding the coupling member out of the range of the constantly oscillating member, a detector engaged by each article progressed through the machine, a cam connected to the detector and having a smooth surface with an offset intermediate its ends, and a trigger independently mounted on the cutter and bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter in the same manner as before to sever the stitch chain rearward of the article; and means operative between the needle and the cutter of the severing mechanism and actuated from the needle shaft for trimming the articles as they are advanced through the machine, along a line parallel with the stitching.

16. In a sewing machine, a needle and complemental means for continuously chain stitching articles fed in spaced relation; four-motion feeding means; a shaft from which the needle is actuated; another shaft from which the complemental stitch forming means and the feeding means are actuated; bearing interconnecting the two shafts for operation in unison; severing mechanism including a member constantly oscillated from the last mentioned of the aforesaid shafts, a cutter operative rearward of the needle with regard to the direction of feeding, a coupling member on the cutter, yielding means for normally holding the coupling member out of the range of the constantly oscillating member, a detector engaged by each article progressed through the machine, a cam connected to the detector and having a smooth surface with an offset intermediate its ends, and a trigger independently mounted on the cutter and bearing upon the cam, whereby as the detector is initially engaged by each article entering the machine, the cam is moved in one direction so that as its offset passes the trigger, the latter is operated to move the coupling member momentarily into the range of the constantly oscillating member for actuation of the cutter to sever the stitch chain in advance of the article, and whereby as the article is progressed beyond the detector, the cam is moved in the opposite direction so that its offset in again passing the trigger, causes another actuation of the cutter in the same manner as before to sever the stitch chain rearward of the article; and a continuously reciprocating blade operative between the needle and the cutter of the severing means and actuated from the needle shaft in synchronism with the needle to trim the articles during the idle retractive periods of the feeding means, along a line parallel with the stitching.

GEORGE SAUER.